Patented June 19, 1928.

1,674,435

UNITED STATES PATENT OFFICE.

MARSTON L. HAMLIN, OF LYNBROOK, NEW YORK, ASSIGNOR TO BEECH-NUT PACKING COMPANY, OF CANAJOHARIE, NEW YORK, A CORPORATION OF NEW YORK.

JELUTONG PRODUCT AND METHOD OF PRODUCING THE SAME.

No Drawing. Application filed November 4, 1927. Serial No. 231,165.

My invention relates to a new and improved jelutong product and method of producing the same and has for its object to produce a non-oxidizing jelutong product. Jelutong is a substance, also known as pontianak, obtained by collecting the latex of *Dyera costulata* and related trees, and coagulating the same by various known coagulants. There are two grades on the market, (1) unpressed or crude, consisting of masses roughly squeezed together after coagulation, and (2) pressed, consisting of the crude which has been boiled in water and thereafter worked into flat cakes which are rolled into loaves by hand and pressed in screw-presses into more or less rectangular form. Both the crude jelutong and the pressed jelutong oxidize quite freely and for that reason are liable to deteriorate to an objectionable extent while stored or being transported to this country.

The jelutong attained by coagulation consists chiefly of resin and gutta, together with a large percentage of aqueous moisture. The terms "resin" and "gutta" when used in connection with jelutong are not the names of chemical individuals or of mixtures of constant composition, but are conventional names for classes of materials defined by their solubility. "Resin" is that portion of the jelutong that, after water and water soluble material have been removed, is soluble in acetone or alcohol. Gutta is that part of the remainder soluble in benzene. These are not absolute definitions, but characterize the materials sufficiently for present purposes. When the resin and gutta are actually separated, as in analysis, the resin is obtained as a yellow to dark amber, brittle, transparent amorphous substance, similar in appearance to ordinary rosin (which belongs to the class of resins). The gutta is obtained as a whitish to pale amber, viscous, sticky substance. Both are substantially tasteless and odorless.

Chemically, the resin of jelutong is a mixture of compounds of carbon, hydrogen and oxygen—alcohols, esters, etc. The gutta consists of rubber-like hydro-carbons, i. e., compounds of carbon and hydrogen only.

One of the great difficulties in using jelutong for chewing gum is the ease with which it deteriorates by oxidation when stored in the factory or during transportation. Physically, this deterioration is shown by a loss of resiliency and the formation of crumbly patches or crusts. These usually are of a yellowish-white or yellowish color.

Chemically, the deterioration results in an increase in resin and a decrease in gutta content, owing to the oxidation by the air. Oxidation is thus the transformation of the gutta hydro-carbons to resin-like materials. The resin formed by oxidation is different chemically from the resin originally present. This is shown by the slight indescribable odor and especially by its bitter taste. This bitter taste which can not be removed makes oxidized jelutong useless for chewing gum manufacture. The loss of resiliency due to destruction of gutta also contributes to its being unsuitable for such use, but is not as serious as the bitter taste due to the resin produced by oxidation.

The common practice of preventing oxidation at present is to store the gum in ponds and rivers before exportation and to keep it wet down while it is in transit or in storage in a factory. The latter is not completely effective. The resin produced by oxidation I term artificial resin as contrasted with the resin originally present in the coagulated gum, and is distinctly different in its effect from such resin as shown by its odor and bitter taste.

I have discovered that oxidation of jelutong can be substantially prevented by mixing with the jelutong certain chemical substances. There are a number of substances which may be used for this purpose. According to one method embodying my invention, the gum is cut up and boiled in a solution containing an amount of primary ammonium phosphate equal to 1% of the weight of the gum, although 0.5% of this weight may be used with good results. There are indications that 3% is not as good as 1%. The precentages above given are based on present jelutong containing about 50% of moisture, which is the normal condition of pressed jelutong. Good results are attained if 100 pounds of jelutong are boiled in 90 to 100 pounds of solution with constant paddling until the jelutong is thoroughly permeated. After this boiling, the aqueous solution is removed and the gum kneaded and/or rolled and/or pressed into convenient form.

Other salts of ammonia which may be used are mentioned below.

Another method of introducing the anti-oxidant consists in melting the gum and while working it hot in a heated mechanical mixer, adding the salts in a concentrated aqueous solution. The primary ammonium phosphate added in this case amounts preferably to about 0.5 or 1.0% by weight of the gum treated. If desired, water may be added to the mix during the mixing process to make up for the evaporation so as to maintain the original moisture content of the jelutong.

As an additional step to either of the methods above set forth, and to obtain a still further improved product, I heat the mix in a heated mechanical mixer so as to drive off the moisture therein until the jelutong is substantially dry and in a fused condition, the moisture content being reduced at least to 3%. The product is then run out of the mixer and cast into blocks.

Instead of primary ammonium phosphate $NH_4H_2PO_4$, secondary ammonium phosphate $(NH_4)_2HPO_4$, primary sodium phosphate $Na_2HPO_4$, secondary sodium phosphate $NaH_2PO_4$, sodium ammonium phosphate $NaNH_4HPO_4$ or phosphoric acid $H_3PO_4$ may be used with substantially the same results. All of the substances above mentioned are ionizable anti-oxidants containing phosphorus and oxygen in the ratio of one atom of phosphorus to four atoms of oxygen. Similar results, but not quite as satisfactory, can be obtained by substituting for the primary ammonium phosphate one of the following:

Ammonium tartrate $(NH_4)_2C_4H_4O_6$
Ammonium sulphate $(NH_4)_2SO_4$
Ammonium chloride $NH_4Cl$, or
Ammonium acetate $NH_4C_2H_3O_2$.

The anti-oxidants are anti-oxidizing compounds distributed uniformly throughout the mass of the jelutong. In both instances after the jelutong has been treated with the anti-oxidant it is formed into suitable shapes and permitted to set.

Either crude or pressed jelutong, treated according to my invention, is preserved against oxidation and the formation of the objectionable artificial resins above referred to is prevented, the resin originally present being preserved and constituting an important and desirable element in the chewing gum ultimately formed from this product.

As will be evident to those skilled in the art, my invention permits of various modifications without departing from the spirit thereof or the scope of the appended claims.

What I claim is:

1. The method of producing a non-oxidizing jelutong product which consists in coagulating the latex of *Dyera costulata* or similar trees, removing the coagulated product and treating the same in a heated condition with an anti-oxidizing compound so as to distribute the compound throughout the mass and render the product substantially non-oxidizing when exposed to the air for long periods of time.

2. The method of producing a non-oxidizing jelutong product which consists in coagulating the latex of *Dyera costulata* or similar trees, removing the coagulated product and treating the same in a heated condition with an ionizable anti-oxidant containing phosphorous and oxygen in the ratio of one atom of phosphorus to four of oxygen so as to distribute the anti-oxidant throughout the mass.

3. The method of producing a non-oxidizing jelutong product which consists in coagulating the latex of *Dyera costulata* or similar trees, removing the coagulated product and treating the same in a heated condition with a phosphate of ammonia so as to distribute the anti-oxidant throughout the mass.

4. The method of producing a non-oxidizing jelutong product which consists in coagulating the latex of *Dyera costulata* or similar trees, removing the coagulated product and treating the same in a heated condition with an anti-oxidizing salt of ammonia so as to distribute the salt of ammonia throughout the mass and render the product substantially non-oxidizing when exposed to the air for long periods of time.

5. The method of producing a non-oxidizing jelutong product which consists in coagulating the latex of *Dyera costulata* or similar trees, removing the coagulated product, treating the same in a heated condition with an anti-oxidizing compound so as to distribute the anti-oxidant throughout the mass and render the product substantially non-oxidizing when exposed to the air for long periods of time, and heating the same in a mechanical mixer until the moisture content is reduced at least to 3% and thereafter casting the same into compact form.

6. A new jelutong product consisting of jelutong and an anti-oxidizing compound distributed throughout its mass.

7. A new jelutong product consisting of jelutong and an ionizable anti-oxidant containing phosphorous and oxygen in the ratio of one atom of phosphorous to four of oxygen distributed throughout its mass.

8. A new jelutong product consisting of jelutong and a phosphate of ammonia distributed throughout its mass.

9. A new jelutong product consisting of jelutong and an anti-oxidizing salt of ammonia distributed throughout its mass.

10. A new jelutong product consisting of jelutong and an anti-oxidizing compound distributed throughout its mass in the form of a compact casting having a water content not exceeding 3% of the mass.

In testimony whereof, I have signed my name to this specification this 2nd day of November, 1927.

MARSTON L. HAMLIN.

---

Certificate of Correction.

Patent No. 1,674,435.   Granted June 19, 1928, to
MARSTON L. HAMLIN.

It is hereby certified that error appears in the printed specification of the above numbered patent requiring correction as follows:

Page 2, line 39, for the formula "$Na_2HPO_4$" read $NaH_2PO_4$, and line 40, for "$NaH_2HPO_4$" read $Na_2HPO_4$; and that the said Letters Patent should be read with these corrections therein that the same may conform to the record of the case in the Patent Office.

Signed and sealed this 31 day of July, A. D. 1928.

[SEAL.]
M. J. MOORE,
*Acting Commissioner of Patents.* taining phosphorous and oxygen in the ratio of one atom of phosphorous to four of oxygen distributed throughout its mass.

8. A new jelutong product consisting of jelutong and a phosphate of ammonia distributed throughout its mass.

9. A new jelutong product consisting of jelutong and an anti-oxidizing salt of ammonia distributed throughout its mass.

10. A new jelutong product consisting of jelutong and an anti-oxidizing compound distributed throughout its mass in the form of a compact casting having a water content not exceeding 3% of the mass.

In testimony whereof, I have signed my name to this specification this 2nd day of November, 1927.

MARSTON L. HAMLIN.

Certificate of Correction.

Patent No. 1,674,435.    Granted June 19, 1928, to
MARSTON L. HAMLIN.

It is hereby certified that error appears in the printed specification of the above numbered patent requiring correction as follows:

Page 2, line 39, for the formula "$Na_2HPO_4$" read $NaH_2PO_4$, and line 40, for "$NaH_2HPO_4$" read $Na_2HPO_4$; and that the said Letters Patent should be read with these corrections therein that the same may conform to the record of the case in the Patent Office.

Signed and sealed this 31 day of July, A. D. 1928.

[SEAL.]

M. J. MOORE,
*Acting Commissioner of Patents.*